US010603824B2

(12) United States Patent
Kagawa (10) Patent No.: US 10,603,824 B2
(45) Date of Patent: Mar. 31, 2020

(54) METHOD FOR MANUFACTURING REEL (71) Applicant: FUJIFILM CORPORATION, Minato-ku, Tokyo (JP)

(72) Inventor: Yusuke Kagawa, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 496 days.

(21) Appl. No.: 15/361,501

(22) Filed: Nov. 28, 2016

(65) Prior Publication Data

US 2017/0217060 A1 Aug. 3, 2017

(30) Foreign Application Priority Data

Feb. 1, 2016 (JP) ................. 2016-017124

(51) Int. Cl.
| *B29C 45/14* | (2006.01) |
| *G11B 23/113* | (2006.01) |
| *G11B 23/04* | (2006.01) |
| *B29C 45/72* | (2006.01) |
| *B29C 67/00* | (2017.01) |
| *B29K 705/02* | (2006.01) |
| *B29K 69/00* | (2006.01) |
| *B29K 305/00* | (2006.01) |
| *B29L 17/00* | (2006.01) |

(52) U.S. Cl.
CPC ........ *B29C 45/14* (2013.01); *B29C 45/14598* (2013.01); *B29C 45/14631* (2013.01); *B29C 45/7207* (2013.01); *G11B 23/044* (2013.01); *G11B 23/113* (2013.01); *B29C 67/0048* (2013.01); *B29K 2069/00* (2013.01); *B29K 2305/00* (2013.01); *B29K 2705/02* (2013.01); *B29L 2017/008* (2013.01)

(58) Field of Classification Search
CPC .............. B29C 45/14; B29C 45/14598; B29C 45/14631; B29C 45/7207; G11B 23/044; G11B 23/113
See application file for complete search history.

(56) References Cited

U.S. PATENT DOCUMENTS

| 3,207,830 A * | 9/1965 | Aldington ............... B29C 51/12 |
| | | 215/250 |
| 2004/0061015 A1 | 4/2004 | Hiraguchi |
| 2009/0218431 A1* | 9/2009 | Mori .................... G11B 23/037 |
| | | 242/348 |

FOREIGN PATENT DOCUMENTS

| JP | 2004-127358 A | 4/2004 |
| JP | 2009-48692 A | 3/2009 |
| JP | 2009-211736 A | 9/2009 |

OTHER PUBLICATIONS

Office Action dated Mar. 5, 2019, issued by the JPO in corresponding Japanese Patent Application No. 2016-017124.

* cited by examiner

Primary Examiner — Joseph S Del Sole
Assistant Examiner — John Robitaille
(74) Attorney, Agent, or Firm — Solaris Intellectual Property Group, PLLC (57) ABSTRACT

A method for manufacturing a reel includes molding a reel configuration component that is made of resin and includes a reel hub with an outer peripheral face for winding a recording tape onto, after the molding and prior to the reel configuration component cooling and shrinking, embedding a reinforcement ring into the reel hub, and after the embedding, cooling and shrinking the reel configuration component and fixing the reinforcement ring to the reel hub.

6 Claims, 6 Drawing Sheets

FIG.1

FIG.5

METHOD FOR MANUFACTURING REEL

CROSS-REFERENCE TO RELATED APPLICATION

This application is based on and claims priority under 35 USC 119 from Japanese Patent Application No. 2016-017124 filed on Feb. 1, 2016, the disclosure of which is incorporated by reference herein.

BACKGROUND

Technical Field

The present disclosure relates to a method for manufacturing a reel for winding a recording tape onto.

Related Art

A single reel that a recording tape such as a magnetic tape has been wound onto is housed in a recording tape cartridge. The reel includes a reel hub with an outer peripheral face for winding the recording tape onto, and the reel hub is formed in a circular tube shape. The reel hub therefore sometimes deforms toward the radial direction inside due to the recording tape being wound tightly when being wound thereon.

When the reel hub deforms toward the radial direction inside, deformation in the width direction occurs in the recording tape that has been wound around the reel hub, and when this deformation becomes excessive, there is a concern of a reading error or the like of the data recorded on the recording tape occurring when played back using a drive device, for example. The influence of this deformation is particularly liable to become apparent when the recording tape has a higher capacity and a higher recording density.

In order to suppress this deformation of the reel hub, structures have been proposed hitherto in which a reinforcement ring made of metal is provided by insert molding to an inner peripheral face side of the reel hub, or inside the reel hub itself, so as to improve the rigidity of the reel hub (see, for example, Japanese Patent Application Laid-Open (JP-A) Nos. 2009-211736 and 2009-48692).

However, the reinforcement ring needs to be positioned and retained inside the mold in a manufacturing method in which the reinforcement ring made of metal is provided to the reel hub by insert molding, such that there is a high degree of technical difficulty and dedicated equipment is required, thereby incurring costs.

SUMMARY

The present disclosure provides a method for manufacturing a reel that is capable of providing a reinforcement ring to a reel hub simply and at a low cost.

A method for manufacturing a reel according to the present disclosure includes a molding process of molding a reel configuration component that is made of resin and includes a reel hub with an outer peripheral face for winding a recording tape onto, after the molding process and prior to the reel configuration component cooling and shrinking, an embedding process of embedding a reinforcement ring into the reel hub, and after the embedding process, a cooling process of cooling and shrinking the reel configuration component and fixing the reinforcement ring to the reel hub.

The present disclosure enables the reinforcement ring to be provided to the reel hub simply and at a low cost.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments according to the present disclosure, based on the drawings.

Note that a reel 20 according to the exemplary embodiments is applied to a recording tape cartridge 10, which is singly housed inside a case 12. Thus, as illustrated in FIG. 1, for ease of explanation, a load direction of the recording tape cartridge 10 into a drive device is indicated by the arrow FR, and the arrow FR indicates the front direction (front side) of the recording tape cartridge 10.

A direction indicated by the arrow RH that is orthogonal to the arrow FR is the right direction (right side) of the recording tape cartridge 10, and a direction indicated by the arrow UP that is orthogonal to both the arrow FR and the arrow RH is an upper direction (upper side) of the recording tape cartridge 10 and the reel 20. In the below explanation, a radial direction and an axial direction of the reel 20 are sometimes simply referred to as "radial direction" and "axial direction".

Figure 1:
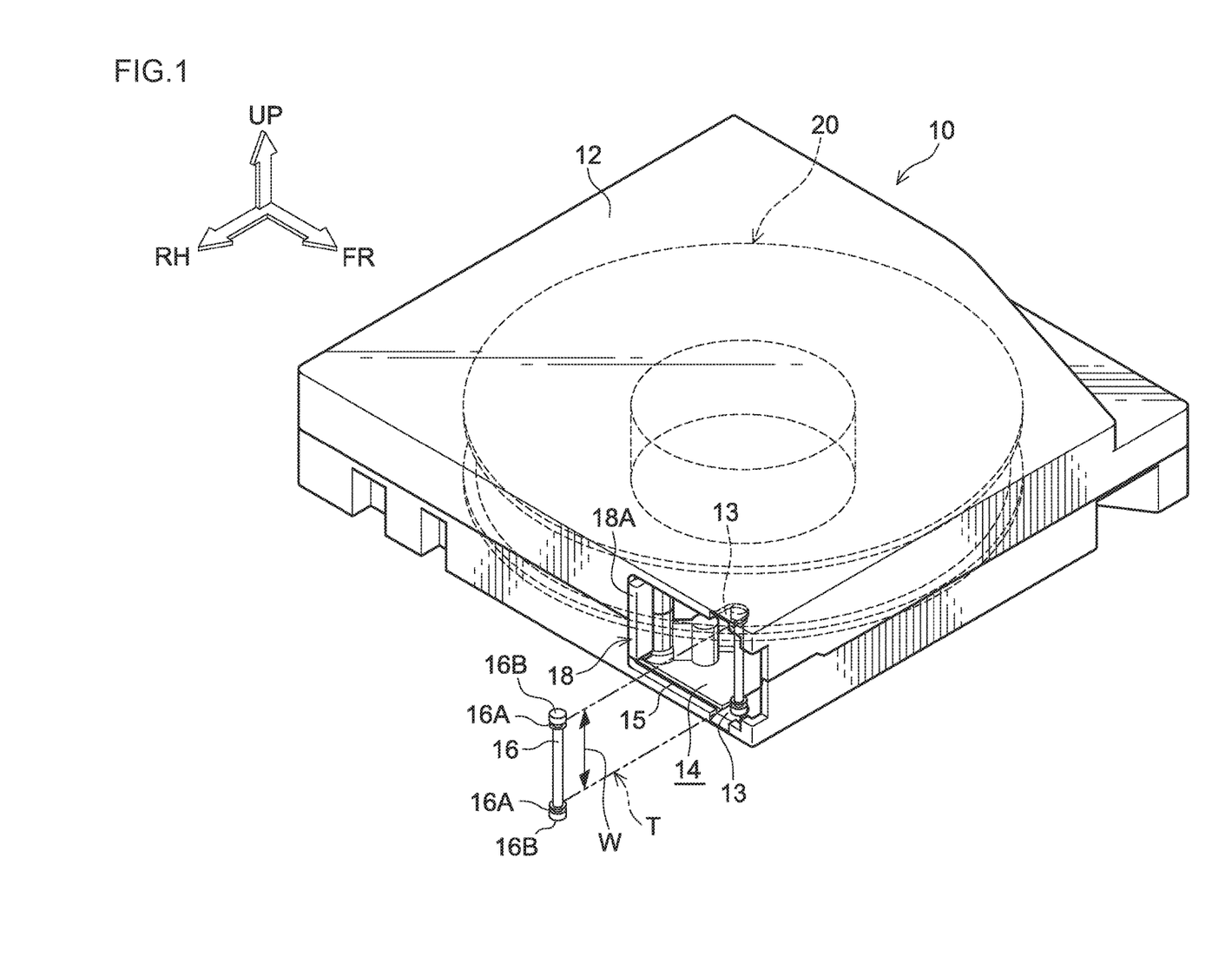
FIG. 1 is a perspective view illustrating a recording tape cartridge in which a reel according to an exemplary embodiment is housed.

As illustrated in FIG. 1, the recording tape cartridge 10 includes the case 12 formed in a substantially rectangular box shape using a resin material such as polycarbonate (PC). A single reel 20 made of resin, onto which a recording tape T such as a magnetic tape serving as an information recording and playback medium is wound, is housed inside the case 12 so as to be capable of rotating. Note that the reel 20 is described in detail later.

An opening 14 for pulling out the recording tape T that has been wound onto the reel 20 is formed in a front portion of a right wall of the case 12. A leader pin 16, serving as a leader member that performs the pull-out operation while anchored to a pull-out member (not illustrated in the drawings) of the drive device, is fixed to a free end of the recording tape T that is pulled out from the opening 14. An annular shaped groove 16A is formed on both axial direction sides of the leader pin 16, and the annular shaped grooves 16A are anchored to hooks or the like of the pull-out member.

An upper and lower pair of pin retaining portions 13 that position and retain the leader pin 16 inside the case 12 are formed inside the opening 14 of the case 12. Each pin retaining portion 13 has a substantially semicircular shape open at the side where the recording tape T is pulled out. Both axial direction ends 16B of the leader pin 16 in an upright state are capable of entering and exiting the pin retaining portions 13 from the open side thereof.

The opening 14 of the case 12 is opened and closed by a door 18. The door 18 is formed in a substantially rectangular plate shape of a size capable of closing the opening 14. Grooves 15, for inserting upper and lower ends of the door 18 so as to be capable of sliding, are formed inside the opening 14 so as to enable the door 18 to move along the right wall of the case 12.

A protrusion 18A used for opening and closing is provided projecting toward the right at a front end of the door 18. The door 18 is configured so as to be opened due to the protrusion 18A engaging with an engagement member (not illustrated in the drawings) of the drive device when the recording tape cartridge 10 is loaded into the drive device.

First Exemplary Embodiment

Detailed explanation follows regarding a reel 20 according to a first exemplary embodiment.

Figure 2:
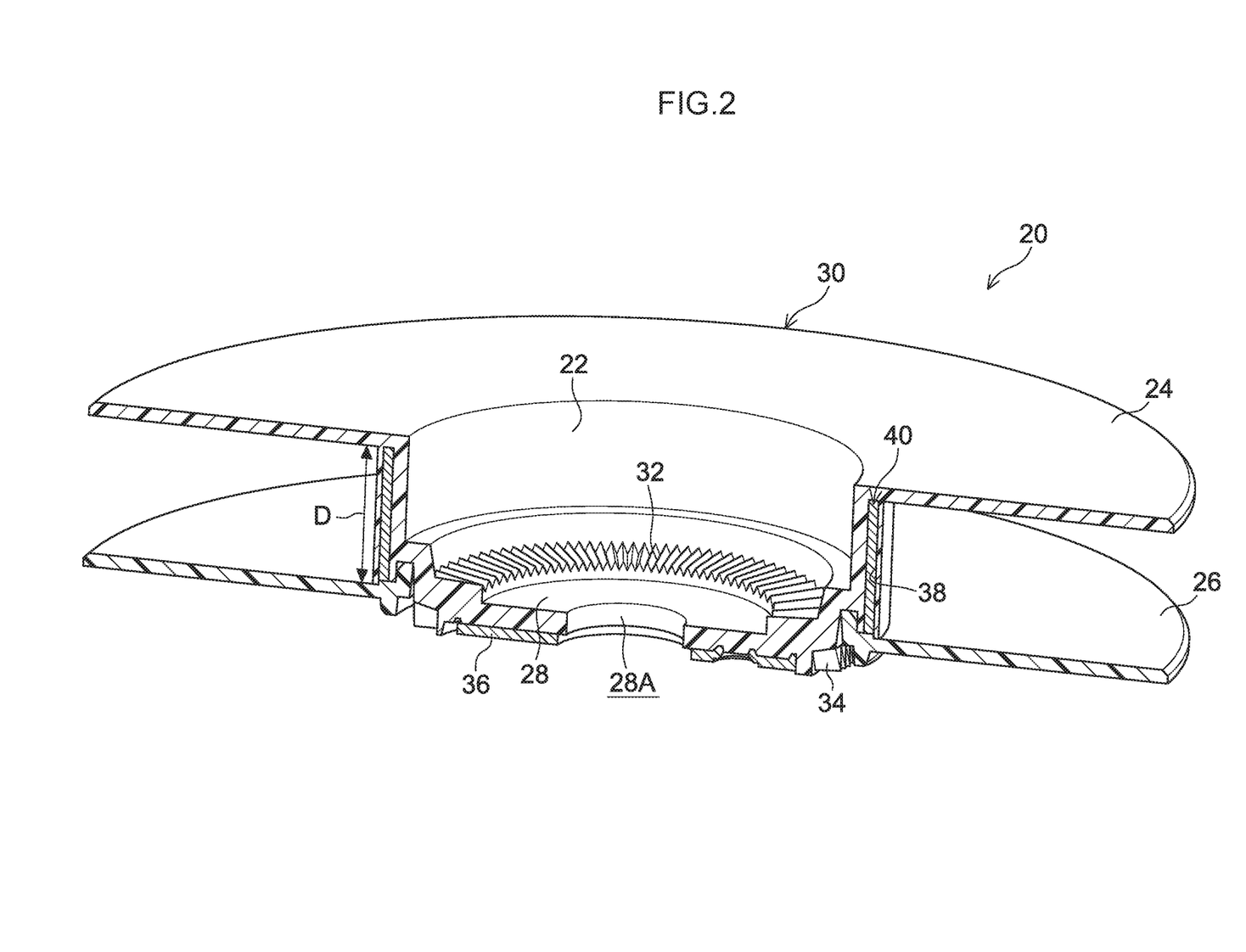
FIG. 2 is a perspective view illustrating a configuration of a reel according to a first exemplary embodiment sectioned along the axial direction.

As illustrated in FIG. 2, the reel 20 is configured by a bottomed circular tube shaped reel hub 22 configuring an axial center portion, an annular shaped upper flange 24 provided extending toward the radial direction outside integral to an upper end of the reel hub 22, and an annular shaped lower flange 26 attached by welding to a lower end of the reel hub 22.

Note that in the reel 20 according to the first exemplary embodiment, the reel hub 22 and the upper flange 24 that are integrally molded together configure a reel configuration component 30. The reel configuration component 30 and the lower flange 26 are each molded using compatible resin materials (such as polycarbonate), and can be easily joined together by a joining method such as ultrasonic welding.

A distance D between an inner face of the upper flange 24 and an inner face of the lower flange 26 at at least an outer peripheral face side of the reel hub 22 is formed slightly greater than a width W (see FIG. 1) of the recording tape T. The positions of both width direction ends of the recording tape T that has been wound onto the outer peripheral face of the reel hub 22 are thereby restricted by the upper flange 24 and the lower flange 26 that face each other.

A bottom wall 28 is integrally provided further toward the radial direction inside than the lower end of the reel hub 22. A circular shaped through-hole 28A is formed in an axial center portion of the bottom wall 28. An engagement gear 32 is formed in an annular shape in an upper face of the bottom wall 28 further toward the radial direction outside than the through-hole 28A.

A brake gear of a brake member (not illustrated in the drawings), configured so as to be incapable of rotating relative to the case 12 and biased toward the bottom wall 28 side under biasing force of a compression coil spring (not illustrated in the drawings), meshes with the engagement gear 32. The brake member thereby brakes the reel 20 when the reel 20 is stored without being loaded in the drive device, for example, such that the reel 20 does not rotate relatively inside the case 12.

When the recording tape cartridge 10 has been loaded into the drive device, a release projection provided to a rotation shaft (not illustrated in the drawings) of the drive device is inserted through the through-hole 28A of the bottom wall 28, and the brake member is pressed upward by the release projection. Configuration is such that the meshing of the brake gear with the engagement gear 32 is thereby released, and the reel 20 is capable of relative rotation inside the case 12.

A reel gear 34 is formed in an annular shape on a lower face of the bottom wall 28 further toward the radial direction outside than the through-hole 28A. The reel gear 34 is exposed through a circular shaped gear opening (not illustrated in the drawings) formed on a bottom plate of the case 12, due to the reel 20 being pressed against the bottom plate under the biasing force of the compression coil spring through the brake member. When the recording tape cartridge 10 has been loaded onto the drive device, the reel gear 34 meshes with a drive gear provided to the rotation shaft of the drive device.

An annular shaped reel plate 36 made of a magnetic material is coaxially and integrally fixed by insert molding or the like to the lower face of the bottom wall 28 further toward the radial direction outside than the through-hole 28A, and further toward the radial direction inside than the reel gear 34. In a meshed state of the drive gear of the drive device and the reel gear 34, the reel plate 36 is stuck by magnetic force to an annular shaped magnet (not illustrated in the drawings) provided to the rotation shaft of the drive device.

Axial misalignment of the reel 20 and the rotation shaft is prevented, and the meshed state of the reel gear 34 and the drive gear is maintained due to the reel plate 36 being stuck to the magnet. Due to the above configuration, the reel 20 rotates integrally with the rotation shaft inside the case 12 when the rotation shaft rotates about its axial center.

Figure 3:
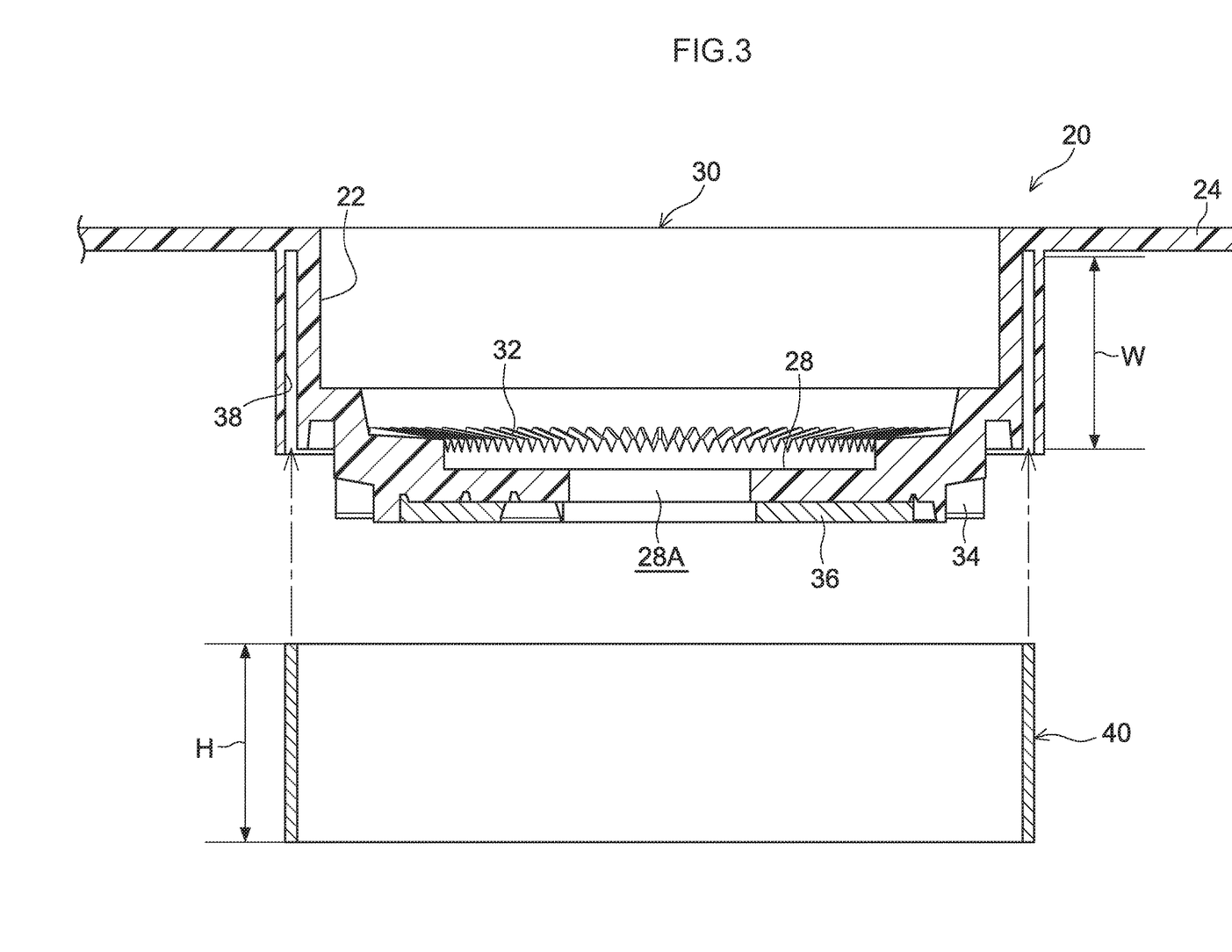
FIG. 3 is a side cross-section illustrating an embedding process of providing a reinforcement ring to a reel hub of a reel configuration component according to the first exemplary embodiment directly after molding.

As illustrated in FIG. 2 and FIG. 3, an annular shaped groove 38, through which a reinforcement ring 40 made of metal (such as an aluminum alloy) is capable of being inserted from below, is formed in the reel hub 22 itself. The reinforcement ring 40 is a ring shaped or circular tube shaped member for reinforcing the reel hub 22, and the depth of the groove 38 is a depth that enables the entire reinforcement ring 40 to be inserted therein.

The reinforcement ring 40 is inserted into and fixed to the groove 38 by a fixing method, described later. Note that an axial direction height H of the reinforcement ring 40 is a height such that the height of a portion overlapping the outer peripheral face of the reel hub 22 in the axial direction when the reinforcement ring 40 has been inserted into and fixed to the groove 38 is the width W of the recording tape T wound onto the outer peripheral face of the reel hub 22, or greater.

Detailed explanation follows regarding operation of the reel 20 (a method for manufacturing the reel 20, including a fixing method of the reinforcement ring 40) according to the first exemplary embodiment configured as described above.

As illustrated in FIG. 3, the reel configuration component 30 in which the reel hub 22 and the upper flange 24 are integrally formed is injection molded using a mold (not illustrated in the drawings) (a molding process). When this is performed, the groove 38 for inserting the reinforcement ring 40 is formed in the reel hub 22 of the reel configuration component 30.

Directly after molding the reel configuration component 30, and prior to the reel configuration component 30 cooling and shrinking (prior to shrinkage ending; within approximately 5 minutes), the reinforcement ring 40 is inserted and embedded in the groove 38 (an embedding process). Note that the temperature of the reinforcement ring 40 is room temperature, but the temperature of the reel configuration component 30 directly after molding is from 80° C. to 100° C. (a high temperature state compared to room temperature), and has expanded by approximately 0.1 mm overall compared to the design value after cooling.

The reinforcement ring 40 may also be inserted and embedded in the groove 38 after the reel configuration component 30 has been molded (after shrinkage has ended), by re-heating the reel configuration component 30 to 80° C. to 100° C. (a high temperature state compared to room temperature) and expanding the reel configuration component 30 by approximately 0.1 mm overall. In such cases, a process to prepare the reel configuration component 30 after molding is referred to as a preparatory process. The above-described molding process may be considered as an example of a preparatory process to prepare the reel configuration component 30.

Figure 4:
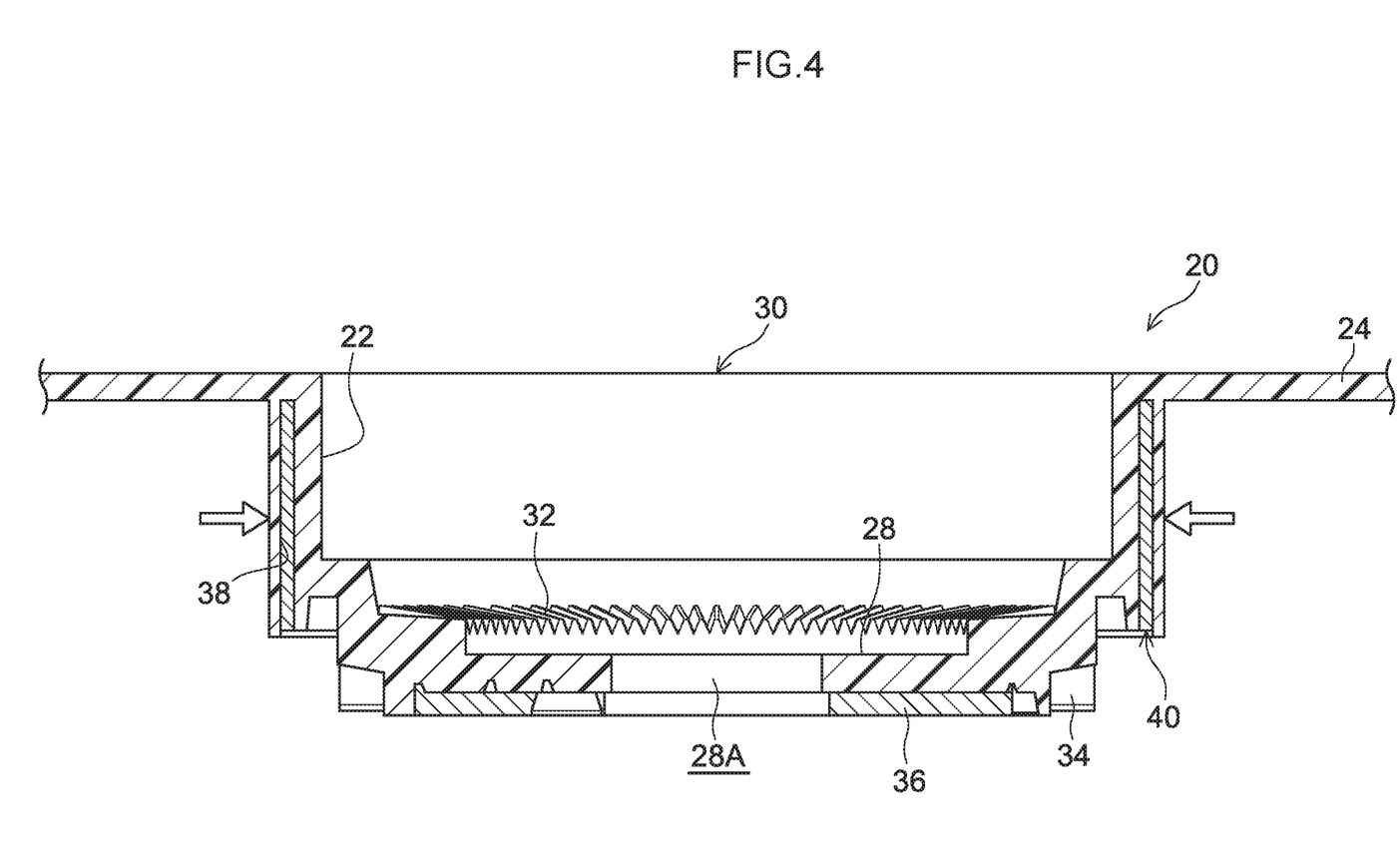
FIG. 4 is a side cross-section illustrating a cooling process in which a reel hub of a reel configuration component according to the first exemplary embodiment is shrunk, and a reinforcement ring is fixed thereto.

As illustrated in FIG. 4, when the reinforcement ring 40 has been embedded in the groove 38 of the reel hub 22, the reel configuration component 30 is left for a time to cool to room temperature (or close to room temperature) (a cooling process). Whereupon the reel configuration component 30 has shrunk by approximately 0.1 mm overall (to a predetermined design value), and the reinforcement ring 40 is fixed inside the groove 38 of the reel hub 22 by being pressed toward the radial direction inside.

This enables the reinforcement ring 40 to be provided to the reel hub 22 (reel configuration component 30) more simply and at a lower cost than in cases in which the reinforcement ring 40 is provided to the reel hub 22 by insert molding. Note that the lower flange 26 is welded to the lower end of the reel hub 22 after the reinforcement ring 40 has been fixed to the reel hub 22 of the reel configuration component 30. The reel 20 is manufactured in this manner.

The axial direction height H of the reinforcement ring 40 is a height such that the height of a portion overlapping the outer peripheral face of the reel hub 22 in the axial direction is the width W of the recording tape T wound onto the outer peripheral face of the reel hub 22, or greater. This enables deformation of the reel hub 22 toward the radial direction inside due to the recording tape T being wound (tightly wound) thereon to be effectively suppressed, and enables the occurrence of deformation in the width direction of the recording tape T being wound onto the outer peripheral face of the reel hub 22 to be suppressed.

This enables the occurrence of a reading error or the like of data recorded on the recording tape T to be suppressed or prevented when the recording tape T is played back using the drive device, for example, even if the recording tape T has a higher capacity and a higher recording density (even if the recording tape T is thinner, and the number of windings has increased).

Note that, although the above-described advantageous effect of suppressing deformation is more efficiently improved when the reinforcement ring 40 is made of metal (aluminum alloy), the reinforcement ring 40 is not limited to being made of metal. The reinforcement ring 40 may be made of resin molded using a resin material (a super engineering plastic such as an amorphous polyarylate or a liquid crystal polymer, or a carbon fiber reinforced plastic, for example) that has a lower shrinkage ratio after molding and a higher rigidity than a resin material (such as polycarbonate) used to mold the reel configuration component 30.

As illustrated in FIG. 4, when the reinforcement ring 40 is provided inside the groove 38 using the method for manufacturing the reel 20 according to the present exemplary embodiment, the reinforcement ring 40 is only exposed in the reel configuration component 30 through the entrance to the groove 38 (the lower end of the reel hub 22) for inserting the reinforcement ring 40. Thus, as illustrated in FIG. 2, since the lower end of the reel hub 22 is closed off by the lower flange 26 when the lower flange 26 is welded to the reel configuration component 30, the location of the reel 20 where the reinforcement ring 40 is exposed no longer exists.

When configuration is such that the reinforcement ring 40 is provided to the reel hub 22 by insert molding, the reinforcement ring 40 needs to be positioned and retained inside the mold, and so a location where the reinforcement ring 40 is exposed inevitably exists on the reel 20. Determination can accordingly be made as to whether or not a reel provided with the reinforcement ring 40 is the reel 20 manufactured by the manufacturing method according to the present exemplary embodiment by the presence of, or lack of, a location where the reinforcement ring 40 is exposed.

Second Exemplary Embodiment

Detailed explanation follows regarding a reel 20 according to a second exemplary embodiment. Note that similar locations to those in the first exemplary embodiment are appended with the same reference numerals, and detailed explanation (including common operation) is omitted as appropriate.

Figure 5:
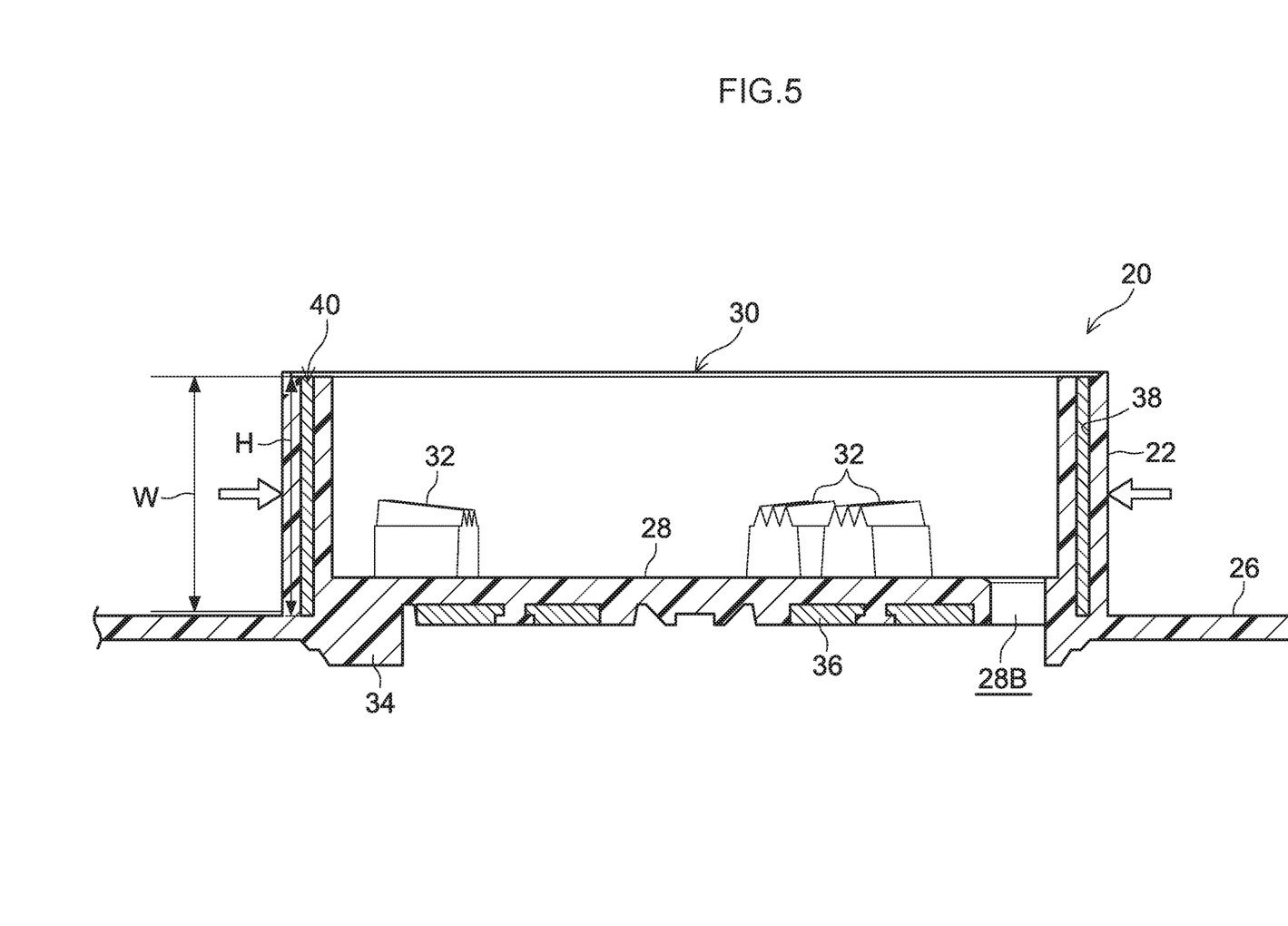
FIG. 5 is a side cross-section illustrating a cooling process in which a reel hub of a reel configuration component according to a second exemplary embodiment is shrunk, and a reinforcement ring is fixed thereto.

As illustrated in FIG. 5, in the reel 20 according to the second exemplary embodiment, the reel hub 22 and the lower flange 26 that are integrally molded together configure the reel configuration component 30. Plural engagement gears 32 are formed at equal spacings about the upper face of the bottom wall 28 of the reel hub 22, and three through-holes 28B are formed at equal spacings about a peripheral edge of the bottom wall 28.

Leg portions of a release pad (not illustrated in the drawings), which are pressed upward due to a drive gear provided to a rotation shaft of a drive device meshing with the reel gear 34 and release the meshing of a brake gear of a brake member and the engagement gears 32, are inserted through the respective through-holes 28B.

The annular shaped groove 38, into which the reinforcement ring 40 made of metal (such as aluminum alloy) is capable of being inserted from above, is formed in the reel hub 22 itself. The depth of the groove 38 is a depth that enables the entire reinforcement ring 40 to be inserted therein, and the reinforcement ring 40 is inserted into and fixed to the groove 38.

Note that, similarly to in the first exemplary embodiment, the axial direction height H of the reinforcement ring 40 is a height such that the height of a portion overlapping the outer peripheral face of the reel hub 22 in the axial direction when the reinforcement ring 40 has been inserted into and fixed to the groove 38 is the width W of the recording tape T wound onto the outer peripheral face of the reel hub 22, or greater.

The reel 20 according to the second exemplary embodiment configured as described above is manufactured similarly to that in the first exemplary embodiment.

Namely, the reel configuration component 30 in which the reel hub 22 and the lower flange 26 are integrally formed is injection molded using a mold (not illustrated in the drawings) (a molding process). When this is performed, the groove 38 for inserting the reinforcement ring 40 is formed in the reel hub 22 of the reel configuration component 30. Directly after molding the reel configuration component 30, and prior to the reel configuration component 30 cooling and shrinking (prior to shrinkage ending; within approximately 5 minutes), the reinforcement ring 40 is inserted and embedded in the groove 38 (an embedding process).

Note that, similarly to in the first exemplary embodiment, the reinforcement ring 40 may be inserted and embedded in the groove 38 after the reel configuration component 30 has been molded (after shrinkage has ended) by re-heating and expanding the reel configuration component 30. In such cases, a process to prepare the reel configuration component 30 after molding is referred to as a preparatory process. The above-described molding process may be considered as an example of a preparatory process to prepare the reel configuration component 30.

When the reinforcement ring 40 has been embedded in the groove 38 of the reel hub 22, the reel configuration component 30 is left for a time to cool to room temperature (or close to room temperature) (a cooling process). Whereupon the reel configuration component 30 has shrunk overall (to a pre-determined design value), and the reinforcement ring 40 is fixed inside the groove 38 of the reel hub 22 by being pressed toward the radial direction inside.

Similarly to in the first exemplary embodiment, this enables the reinforcement ring 40 to be provided to the reel hub 22 (reel configuration component 30) simply and at a low cost. Note that an annular shaped upper flange (not illustrated in the drawings) is welded to the upper end of the reel hub 22 after the reinforcement ring 40 has been fixed to the reel hub 22 of the reel configuration component 30. The reel 20 is manufactured in this manner.

Third Exemplary Embodiment

Detailed explanation follows regarding a reel 20 according to a third exemplary embodiment. Note that similar locations to those in the first exemplary embodiment and second exemplary embodiment are appended with the same reference numerals, and detailed explanation (including common operation) is omitted as appropriate.

Figure 6:
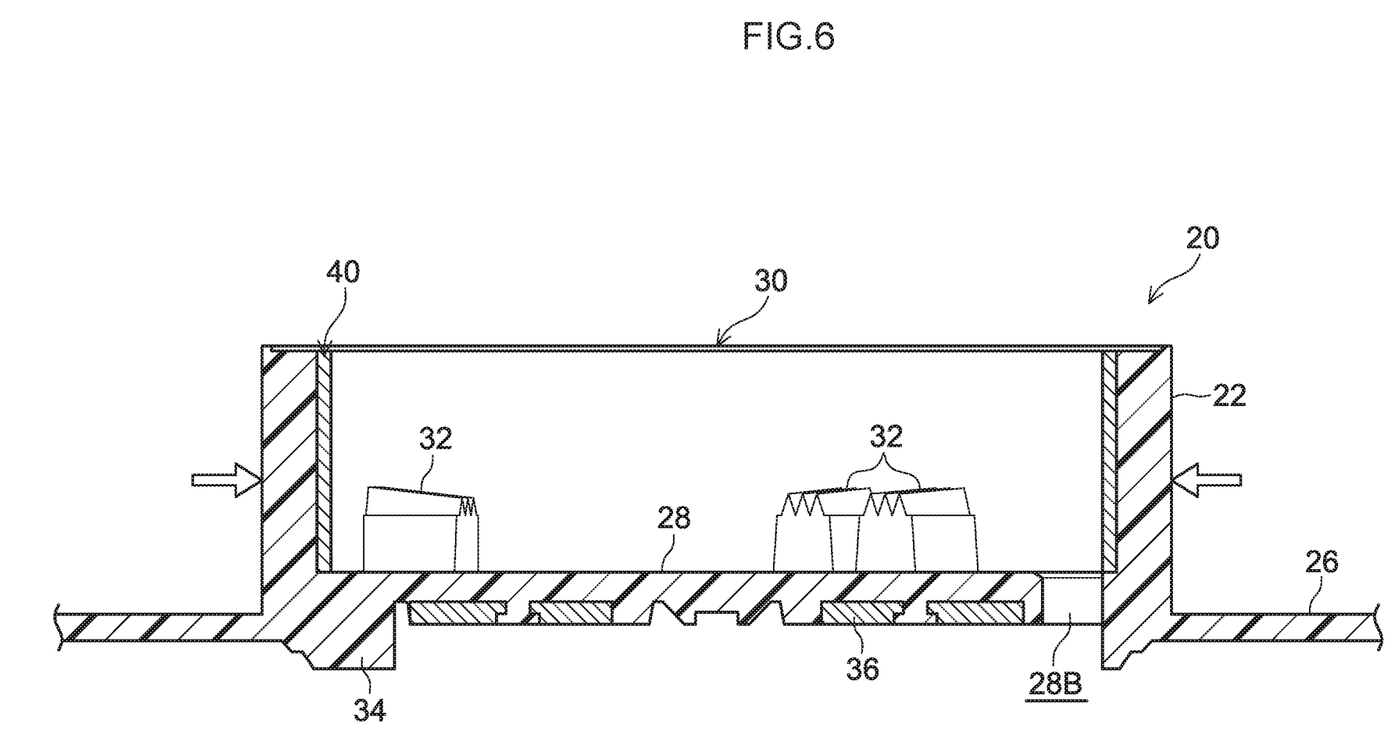
FIG. 6 is a side cross-section illustrating a cooling process in which a reel hub of a reel configuration component according to a third exemplary embodiment is shrunk, and a reinforcement ring is fixed thereto.

As illustrated in FIG. 6, in the reel 20 according to the third exemplary embodiment, the reel hub 22 and the lower flange 26 that are integrally molded together configure the reel configuration component 30. There is no groove 38 for inserting the reinforcement ring 40 formed in this reel hub 22. The reinforcement ring 40 is provided at the radial direction inside (an inner peripheral face side) of the reel hub 22 in a state in which its outer peripheral face is in close contact with the inner peripheral face of the reel hub 22.

The reel 20 according to the third exemplary embodiment is manufactured in the following manner.

First, the reel configuration component 30 in which the reel hub 22 and the lower flange 26 are integrally formed is injection molded using a mold (not illustrated in the drawings) (a molding process). Directly after molding the reel configuration component 30, and prior to the reel configuration component 30 cooling and shrinking (prior to shrinkage ending; within approximately 5 minutes), the reinforcement ring 40 is inserted and embedded at the inner peripheral face side of the reel hub 22 (an embedding process).

Note that the external diameter of the reinforcement ring 40 of the third exemplary embodiment is formed slightly larger (by approximately 0.05 mm, for example) than the internal diameter of the reel hub 22 after shrinkage, and slightly smaller (by approximately 0.05 mm, for example) than the internal diameter of the reel hub 22 prior to shrinkage.

Similarly to in the first exemplary embodiment, the reinforcement ring 40 may be inserted into and embedded at the inner peripheral face side of the reel hub 22 after the reel configuration component 30 has been molded (after shrinkage has ended) by re-heating and expanding the reel configuration component 30. In such cases, a process to prepare the reel configuration component 30 after molding is referred to as a preparatory process. The above-described molding process may be considered as an example of a preparatory process to prepare the reel configuration component 30.

When the reinforcement ring 40 has been embedded at the inner peripheral face side of the reel hub 22, the reel configuration component 30 is left for a time to cool to room temperature (or close to room temperature) (a cooling process). Whereupon the reel configuration component 30 has shrunk overall (to a pre-determined design value), and the reinforcement ring 40 is fixed to the inner peripheral face side of the reel hub 22 by being pressed toward the radial direction inside.

Similarly to in the first exemplary embodiment and the second exemplary embodiment, this enables the reinforcement ring 40 to be provided to the reel hub 22 (reel configuration component 30) simply and at a low cost. Note that an annular shaped upper flange (not illustrated in the drawings) is welded to the upper end of the reel hub 22 after the reinforcement ring 40 has been fixed to the reel hub 22 of the reel configuration component 30. The reel 20 is manufactured in this manner.

Methods for manufacturing the reel 20 according to the above exemplary embodiments have been explained above based on the drawings; however, methods for manufacturing the reel 20 according to the above exemplary embodiments are not limited to those illustrated in the drawings, and design modifications may be applied as appropriate within a range not departing from the spirit of the present disclosure. For example, the shape of the engagement gear 32 of the reel configuration component 30 and so on is not limited to that illustrated in the drawings.

The reel 20 in each of the above exemplary embodiments is what is referred to as a two piece structure configured such that the lower flange 26 or upper flange 24 is welded to the reel configuration component 30 in which the reel hub 22 and the upper flange 24 or lower flange 26 are integrally molded together. However, the method for manufacturing applied to a reel 20 according to the present exemplary embodiment is not limited thereto.

Namely, the method for manufacturing a reel 20 according to the present exemplary embodiment may be applied to what is referred to as a three piece reel structure (not illustrated in the drawings), configured such that the reel hub 22, the upper flange 24, and the lower flange 26 are molded separately from each other and are welded or assembled together.

What is claimed is:

1. A method for manufacturing a reel, the method comprising:
   molding a reel configuration component that is made of resin and includes a reel hub with an outer peripheral face for winding a recording tape onto, and that is formed by injection molding;
   after the molding and prior to the reel configuration component cooling and shrinking, embedding a reinforcement ring into the reel hub while maintaining a diameter of the reinforcement ring; and after the embedding process, a cooling process of cooling and shrinking the reel configuration component and fixing the reinforcement ring to the reel hub;

wherein the molding includes forming a groove in the reel hub in the axial direction for inserting the reinforcement ring in the groove, and wherein the axial direction height of the reinforcement ring is a height such that the height of a portion overlapping an outer peripheral face of the reel hub in the axial direction when the reinforcement ring has been inserted into and fixed to the groove is a width of a recording tape wound onto the outer peripheral face of the reel hub, or greater.

2. A method for manufacturing a reel, the method comprising:

preparing a reel configuration component that is made of resin and includes a reel hub with an outer peripheral face for winding a recording tape onto, and that is formed by injection molding;

embedding a reinforcement ring into the reel hub while maintaining a diameter of the reinforcement ring in a state in which the reel configuration component is at a higher temperature than room temperature; and after the embedding, cooling and shrinking the reel configuration component and fixing the reinforcement ring to the reel hub;

wherein the injection molding includes forming a groove in the reel hub in the axial direction for inserting the reinforcement ring in the groove, and wherein the axial direction height of the reinforcement ring is a height such that the height of a portion overlapping an outer peripheral face of the reel hub in the axial direction when the reinforcement ring has been inserted into and fixed to the groove is a width of a recording tape wound onto the outer peripheral face of the reel hub, or greater.

3. The method for manufacturing a reel of claim 1, wherein the reinforcement ring is formed of a metal material.

4. The method for manufacturing a reel of claim 2, wherein the reinforcement ring is formed of a metal material.

5. The method for manufacturing a reel of claim 1, wherein the reinforcement ring is formed of a resin material that has a lower shrinkage ratio after molding and a higher rigidity than a resin material for molding the reel configuration component.

6. The method for manufacturing a reel of claim 2, wherein the reinforcement ring is formed of a resin material that has a lower shrinkage ratio after molding and a higher rigidity than a resin material for molding the reel configuration component.

* * * * *